(12) United States Patent
Kulick et al.

(10) Patent No.: US 7,065,596 B2
(45) Date of Patent: Jun. 20, 2006

(54) METHOD AND APPARATUS TO RESOLVE INSTRUCTION STARVATION

(75) Inventors: S. Steven Kulick, Portland, OR (US); Rajee S. Ram, Beaverton, OR (US); Sin Sim Tan, Portland, OR (US); Rami A. Naqib, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 10/251,083

(22) Filed: Sep. 19, 2002

(65) Prior Publication Data

US 2004/0068597 A1    Apr. 8, 2004

(51) Int. Cl.
*G06F 12/00* (2006.01)

(52) U.S. Cl. .......................... 710/240; 710/45; 710/117

(58) Field of Classification Search ........ 710/240–244, 710/260–266, 305–306, 313, 45, 117
See application file for complete search history.

(56) References Cited

U.S. PATENT DOCUMENTS

| | | | |
|---|---|---|---|
| 4,298,954 A | 11/1981 | Bigelow et al. | |
| 4,933,840 A | 6/1990 | Sera et al. | |
| 4,953,081 A | 8/1990 | Feal et al. | |
| 5,276,681 A | 1/1994 | Tobagi et al. | |
| 5,291,459 A | 3/1994 | Andersen | |
| 5,305,446 A | 4/1994 | Leach et al. | |
| 5,365,552 A | 11/1994 | Astle | |
| 5,410,652 A | 4/1995 | Leach et al. | |
| 5,440,691 A | 8/1995 | Carrafiello et al. | |
| 5,448,701 A | 9/1995 | Metz, Jr. et al. | |
| 5,535,341 A | 7/1996 | Shah et al. | |
| 5,546,543 A | 8/1996 | Yang et al. | |
| 5,706,446 A * | 1/1998 | Kalish et al. | 710/113 |
| 5,941,967 A * | 8/1999 | Zulian | 710/107 |
| 5,956,489 A | 9/1999 | San Andres et al. | |
| 6,052,708 A | 4/2000 | Flynn et al. | |
| 6,073,132 A | 6/2000 | Gehman | |
| 6,073,159 A | 6/2000 | Emer et al. | |
| 6,081,859 A * | 6/2000 | Munguia | 710/107 |
| 6,178,477 B1 * | 1/2001 | Jaramillo et al. | 710/310 |
| 6,209,067 B1 * | 3/2001 | Collins et al. | 711/158 |
| 6,212,544 B1 | 4/2001 | Borkenhagen et al. | |
| 6,282,598 B1 * | 8/2001 | Manabe | 710/107 |
| 6,292,865 B1 | 9/2001 | McTague et al. | |
| 6,651,158 B1 | 11/2003 | Burns et al. | |
| 6,697,904 B1 | 2/2004 | Bennett | |
| 6,708,240 B1 * | 3/2004 | Willke et al. | 710/240 |
| 6,718,422 B1 * | 4/2004 | Kelley et al. | 710/309 |

(Continued)

FOREIGN PATENT DOCUMENTS

EP    0 488 501 A2    9/1991

(Continued)

OTHER PUBLICATIONS

Mano, M. Morris, Computer System Architecture, 1982, Prentice-Hall, Inc., 2nd Edition, pp. 26-35.

(Continued)

*Primary Examiner*—Rehana Perveen
*Assistant Examiner*—Kim T. Huynh
(74) *Attorney, Agent, or Firm*—Blakely, Sokoloff, Taylor & Zafman LLP (57) ABSTRACT

Various methods and apparatuses to deactivating the mechanism to resolve instruction starvation if an agent which issued a first transaction does not reissue the first transaction within a predefined time period.

37 Claims, 7 Drawing Sheets

U.S. PATENT DOCUMENTS

| | | | |
|---|---|---|---|
| 6,792,516 B1 * | 9/2004 | Mastronarde et al. | 711/158 |
| 2002/0042856 A1 * | 4/2002 | Hartwell et al. | 710/263 |
| 2002/0199089 A1 | 12/2002 | Burns et al. | |
| 2003/0023658 A1 | 1/2003 | Kalafatis et al. | |
| 2003/0229744 A1 * | 12/2003 | Moss | 710/240 |
| 2004/0068597 A1 * | 4/2004 | Kulick et al. | 710/240 |

FOREIGN PATENT DOCUMENTS

| | | |
|---|---|---|
| EP | 0 617 361 A2 | 3/1994 |
| WO | WO 01/04750 A1 | 6/2000 |

OTHER PUBLICATIONS

Eggers, Susan J., et al. "Simultaneous Multithreading: A Platform For Next-Generation Processors," Sep./Oct. 1997, IEEE Micro, pp. 12-19.

Burns, David W., Pre-Silicon Validation of Pentium4's SMT Capabilities, Intel Design and Test Technology Conference, pp. 1-5.

Intel E8870 Scalable Node Controller (SNC) Datasheet, Document No. 251112-001, Aug. 2002.

* cited by examiner

METHOD AND APPARATUS TO RESOLVE INSTRUCTION STARVATION

BACKGROUND OF THE INVENTION

Typically with many bus systems, a device wishing to initiate a transfer between itself and another device must request and be granted the exclusive use of the bus for a period of time. Since more than one device may request the bus at the same time, an arbiter is necessary to determine which requester will be granted immediate use of the bus and which requesters must wait.

In some previous systems employing agents, any agent wishing to use the bus places a request signal to the arbiter. If two or more agents are requesting the bus at the same time, the arbiter chooses one of those requesters by sending a grant signal to that requester. In other previous systems, the processor bus has distributed arbitration. All agents know in advance which agent has priority, and that agent seizes it. When a requesting agent makes a request, the target device (the device with which the requesting agent wishes to communicate data) may not be able to accept that particular transaction. If not, the requesting agent receives a retry indication from the target and must relinquish the bus. The requesting agent re-issues the request usually by sending another request signal to the arbiter to start the cycle all over again. In this situation, the target device is receiving the transaction from the agent, but the target device is not satisfying the request.

The retry response indicates to the requesting agent that the transaction could not be completed at the present time. Further, the cycle to request use of the target device should be retried at a later time, if required for the progress of the requesting processor. The arbitration mechanism employed, such as round robin, hierarchical, etc, attempts to allocate use of the target device by all of the agents attempting to use the target device.

In systems that share a system resource, instruction starvation may occur. In general, instruction starvation occurs when one requesting agent repeatedly attempts to make forward progress on executing an instruction stream but for some reason is repeatably prevented from making any forward progress on executing that instruction stream.

For example, if agent A requests and is granted the bus, then agent A can transfer enough data to fill up a buffer before terminating the transaction. If agent B is then granted the bus while the buffer is still full, agent B receives a retry response and must drop the request. As the next requesting device in the rotation, agent A may request and be granted the bus again. The buffer has by then had time to free up some memory space, which agent A proceeds to fill up again. In time, agent B gets another chance to have access to the bus and request use of the buffer, but agent B again receives a retry response, since the buffer is by now full again. In this manner, agent A will be granted access every time it makes a bus request, while agent B will never be granted access until device A has completed all transfers. This defeats the purpose of rotating priority, which is to give every device equal access to the bus and use of a target device. Worse yet, agent B may be indefinitely starved.

A transaction issued from an agent in a multiple agent system is typically composed of several parts such as the agent identifier (agent ID), transaction identifier (transaction ID), and the transaction type. The agent ID uniquely identifies which agent i.e. device or thread sent the transaction. An agent also assigns a unique transaction ID to each transaction issued in order to monitor the progress of that transaction. For example, the agent may issue ten transactions prior to receiving a completion back to the first issued transaction. Thus, the agent keeps track of when completion has been received based on what transaction ID's have been received back. In this way, the agent is able to determine what has occurred and what still needs to happen next for a particular transaction by use of the transaction identifier. Also, the agent is able to associate completions with the correct transaction. The transaction type communicates the specific kind of transaction included in this transaction, such as an input-output read operation, an input-output write operation, bus line request, a cache eviction, etc.

A prior art technology attempted to detect instruction starvation by associating retry responses with transactions through their transaction ID). Thus, this previous instruction starvation technology depended on agents re-issuing the exact same transaction ID to the same target. Unfortunately, some processors issue speculative transactions that are not issued again once the retry response is received. Thus, if a speculative transaction triggered activation of the instruction starvation resolution mechanism and then never issued that speculative transaction again, the computer system could eventually hang. The computer system could hang because the mechanism to resolve instruction starvation activates and then waits for reissuance of this speculative transaction with its unique transaction ID that will never be issued again.

BRIEF DESCRIPTION OF THE DRAWINGS

The drawings refer to embodiments of the invention in which.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific algorithms, named component blocks, states of performance, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely example. The specific details may be varied from and still be contemplated to be within the spirit and scope of the present invention. Numerical designations, such as a first transaction, do not have numeric connotations associated with their use. A first transaction is simply a different transaction than a second transaction. The term coupled is defined as meaning connected either directly or indirectly through another component. In an embodiment, a transaction is synonymous with a request.

In general, a method, apparatus and system are described that deactivate a mechanism to resolve instruction starvation if an agent which issued the first transaction does not reissue the first transaction within a predefined time period.

Figure 1:
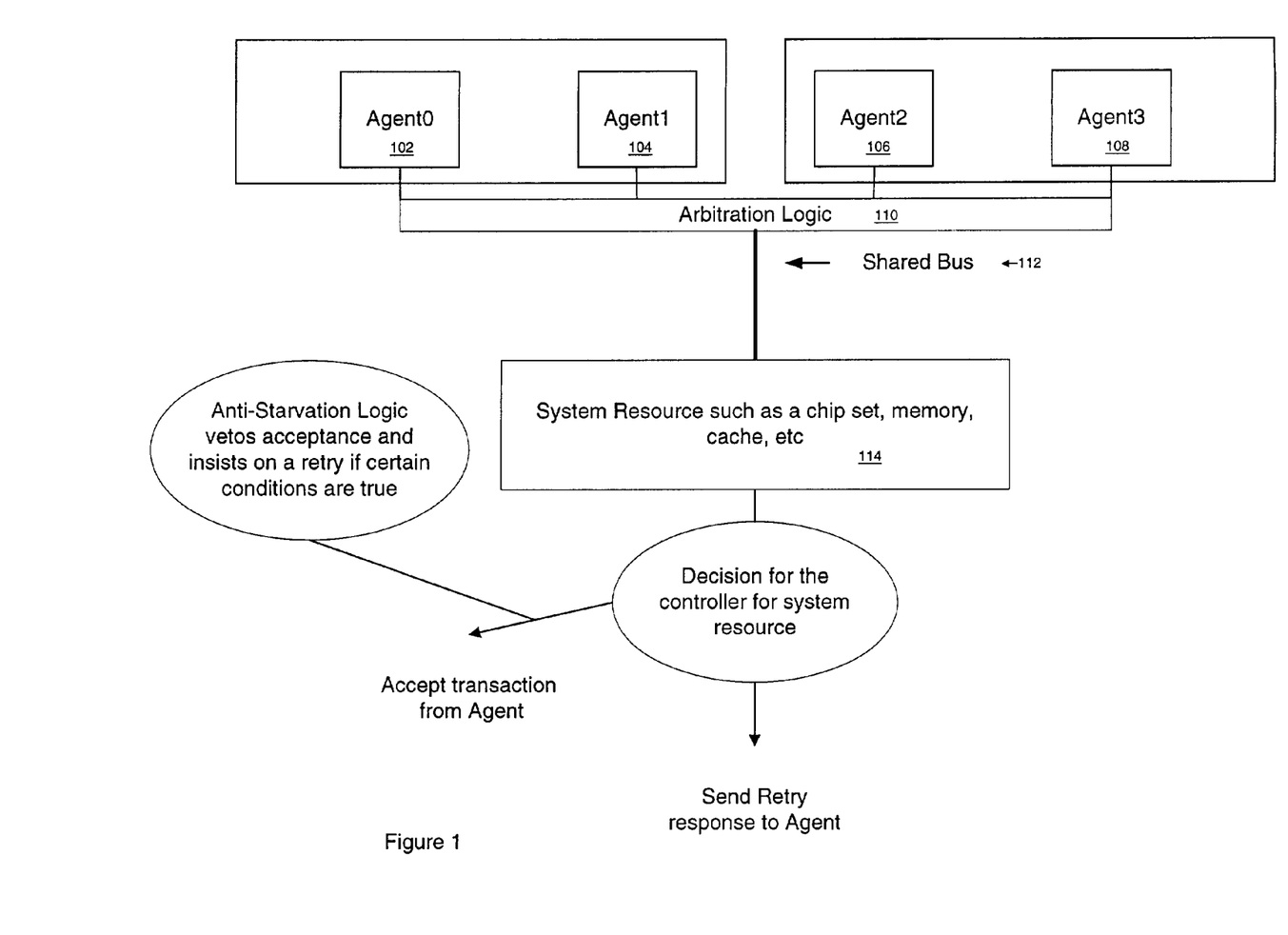
FIG. 1 is an example logic diagram to determine whether instruction starvation is occurring and to resolve instruction starvation if an agent which issued a first transaction does not reissue the first transaction within a predefined time period.

FIG. 1 is an example logic to determine whether instruction starvation is occurring and to resolve instruction starvation if an agent which issued a first transaction does not reissue the first transaction within a predefined time period. A controller for a system resource may contain this logic to accept or not accept a transaction from an agent attempting to utilize that system resource. In an embodiment, a controller is a device that controls the transfer of data to and from a source agent such as a central processing unit to a target system resource. Multiple agents such as Agent 102 through Agent 104 vie through arbitration logic 110 to use a shared bus 112 to send a transaction to the shared system resource 114 such as, for example, but not limited to, a chip set, a memory, a cache, etc. One of the multiple agents 102, 104, 106, 108 wins the arbitration and becomes the source agent. The source agent sends a transaction to the target system resource. Generally, if the system resource 114 is available for use at that moment in time, then the controller for the system resource 114 accepts the transaction and sends an acceptance to the source agent. If the system resource 114 is not available for use when the transaction is received, then the controller for the system resource 114 rejects the transaction and sends a retry response to the source agent. The logic in the controller further contains guidelines to resolve instruction starvation, such as anti-starvation logic.

The anti-starvation logic 116 may veto the acceptance of the transaction and insists on a retry if certain logical conditions are true. The anti-starvation logic 116 attempts to restore fairness back into the arbitration process by vetoing an acceptance of a transaction from a first source agent if the anti-starvation logic 116 detects instruction starvation is occurring to a second source agent attempting to use the same system resource 114. In an embodiment, after activating the anti-starvation logic, the anti-starvation logic 116 accepts exactly one transaction from each agent 102, 104, 106, 108 attempting to use the system resource 114 until all of the agents 102, 104, 106, 108 attempting to use that system resource 114 complete one transaction. In an embodiment, the processor is constructed so that the system makes forward progress on executing an instruction stream progress as long as all of the agents 102, 104, 106, 108 attempting to use that system resource 114 to complete one transaction. After accepting that first transaction from the first agent such as Agent 106, then the anti-starvation logic 116 vetos acceptance of any further transactions from the agent having that same unique agent ID or thread ID. After the veto, the controller for the system resource 114 issues a retry response to the source agent.

The anti-starvation logic 116 may deactivate the vetoing mechanism if an agent, which issued the transaction that activated the anti-starvation logic 116, does not reissue the first transaction after receiving a retry response within a predefined time period. In an embodiment, the predefined time period comprises a threshold amount of retry responses sent to one or more agents, such as one hundred and fifty total retry responses issued since the activation of the anti-starvation logic 116. In an embodiment, the predefined time period comprises a threshold amount of time, such as N number of microseconds. In an embodiment, the number of retries to time out is variable to ensure that the mechanism does not resonate with any reasonable livelock cycles embedded in the hardware The agent may not reissue the first transaction because the first transaction was speculative, preemptively issued in anticipation of an event that did not in fact occur, etc. Similarly, the agent may not reissue the first transaction because a circumstance exists to prevent the agent from reissuing the first transaction. For example, the agent anticipatorily issued the first transaction but now needs to wait for the completion of an instruction routine by another device prior to proceeding with the instruction stream associated with the first transaction. Similarly, an agent 102, 104, 106, 108 may issue other transactions first that may take so long to re-issue, that the operating system requirements are violated and may never re-issue the transaction of interest or issue no transaction until certain transactions from other agents are complete.

An agent may refer to a device attempting to use a system resource such as, for example, a processor, a controller, an input-output device, a thread, or any similar component. As used herein, the term "thread" refers to a self-contained program that is usually associated with a thread identifier and during execution in a multi-threaded environment its architectural state can be maintained while executing instructions from another thread. Alternatively, a thread may be a time multiplexing processor concurrently executing multiple instruction streams rather than a program. In an embodiment, each thread contains a unique identifier to relate a transaction back to that particular source thread. Typically, a multi-threaded processor switches between execution of two or more threads.

For example, in a video phone application, the multi-threaded processor may be called upon to execute code to process video image data as well as audio data. There may be separate code sequences whose execution is designed to handle each of these data types. Thus, a first thread may include instructions for video image data processing and a second thread may be an instruction.

Figure 2:
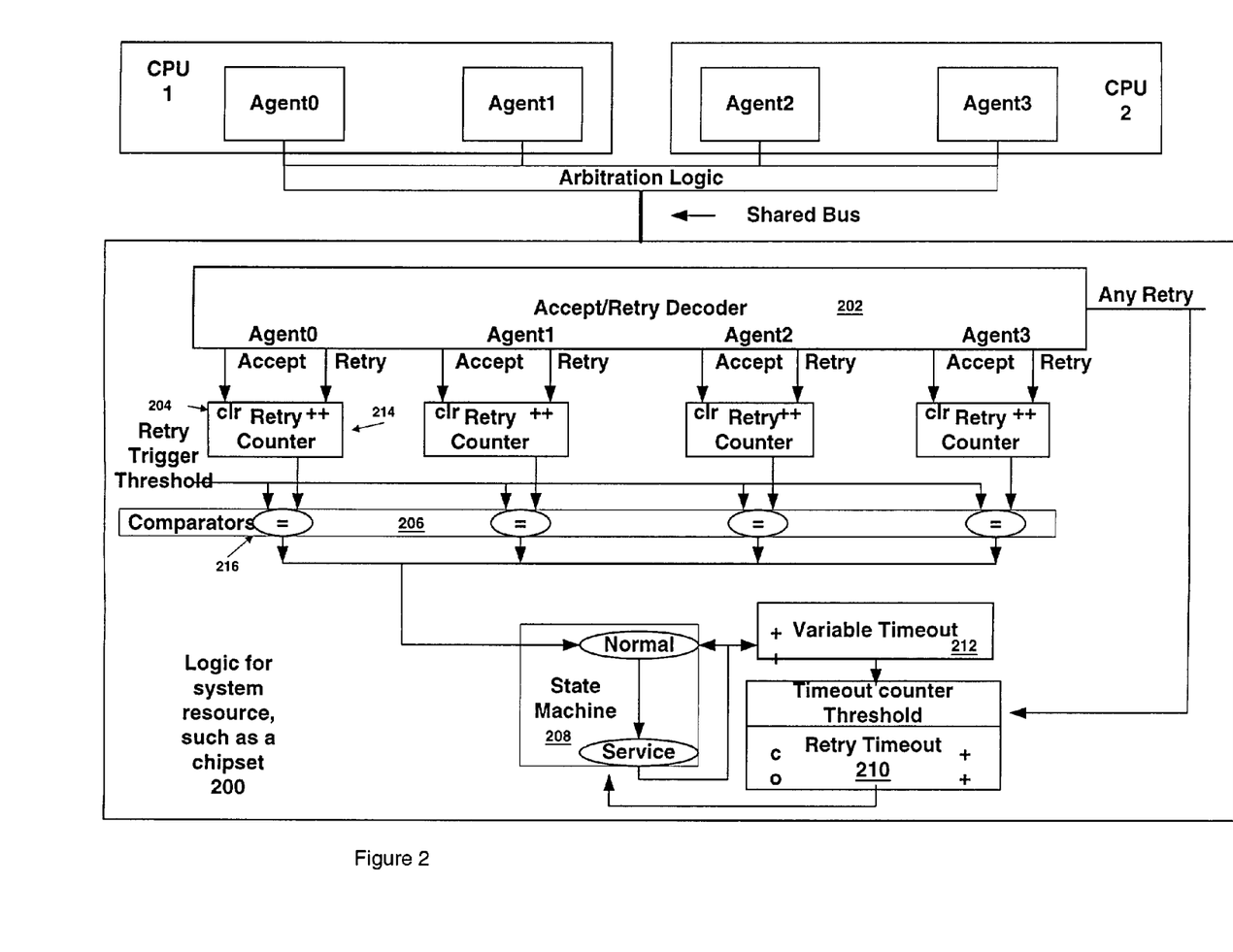
FIG. 2 illustrates an embodiment of logic to determine whether instruction starvation is occurring and to resolve instruction starvation if an agent which issued a first transaction does not reissue the first transaction after receiving a retry response within a predefined time period.

FIG. 2 illustrates an embodiment of logic to determine whether instruction starvation is occurring and to resolve instruction starvation if an agent which issued a first transaction does not reissue the first transaction within a predefined time period after receiving a retry response. In an embodiment, the logic 200 may include accept/retry decoders 202, two or more retry counters 204, one or more comparators 206, one or more state machines 208, a retry timeout counter 210, and a variable timeout counter 212. In an embodiment, the logic 200 consists of electronic circuits that follow the rules of Boolean Logic, software that contains patterns of instructions, or some combination of both.

The one or more accept/retry decoders 202 detect and filter out transaction types that should not trigger activation of the mechanism to resolve instruction starvation in a computing processing system. In an embodiment, the retry decoder maintains an updateable database of transaction types that should be ignored. Also, each accept/retry decoder 202 detects retry responses as well as accept responses and associates them with the agent that issued the transaction. The accept/retry decoder 202 decodes the incoming transaction and identifies the transaction type, agent ID, and thread ID if one exists. Transaction types that should not trigger activation of a mechanism include transaction types not susceptible to starvation such as, for example, write transactions, and transaction types that do not imply forward progress of execution of the instruction stream.

In an embodiment, certain transaction types associated with a specific agent ID or thread ID do not actually create forward progress on the execution of an instruction stream and could fool the mechanism to resolve instruction starvation. These certain transaction types do not create forward progress on execution of an instruction stream; they are merely preparatory or ancillary to the execution of an instruction stream. Thus, the accept/retry decoder 202 filters out the transaction types from activating or deactivating the mechanism to resolve instruction starvation.

For example, an eviction transaction that merely clears space in a cache memory to store the next sequence of instruction in the instruction stream does not by itself indicate that forward progress is being made on executing that instruction stream. The cache may be cleared and the instruction sent into the cache, however the target component may be unavailable to execute those instructions. Similarly, the thread ID of the eviction may be unrelated to forward progress. Eventually, another agent sends an eviction transaction and clears the existing instructions. The instruction starvation mechanism might have interpreted the acceptance of the eviction transaction as a sign of the first processor making progress when in fact the no progress is being made in the actual execution of the instructions in the instruction stream.

In the case of a thread or similar component which shares a common execution device but are execute independently of each other, the accept/retry decoder 202 associates a retry counter based on the unique identifier of each thread vice the shared agent ID. This prevents a situation within the same multi-threaded processor where the processing of the first thread either blocks or unduly delays instruction fetching for the second thread. In an embodiment, the counter tracks whether a transaction makes progress since it is cleared when a transaction is accepted. Threads in one physical processor are treated symmetrically with threads in other physical processors. Thus, the second thread may suffer instruction starvation even though the multi-threaded processor appears to be making forward progress.

The two or more retry counters 204 associate retry responses sent in response to a transaction with a corresponding agent that issued the transaction. In an embodiment, each agent 102, 104, 106, 108 has a retry counter 204 associated with that agent. In an embodiment, each retry counter 204 tracks the retry responses sent to an agent based upon the unique agent identifier associated with the transaction such as an agent ID or thread ID. Each retry counter 204 may couple to a comparator 206.

The one or more comparators 206 determine if a given agent exceeds a retry threshold limit such as N consecutive retries. N consecutive retries may be any number such as twenty, thirty, etc. For example, the first retry counter 214 communicates to the first comparator 216 the number of retry responses sent to a corresponding agent that issued the transaction. The retry counter 204 for each agent increments when that agent gets retried. Also, the retry counter 204 for each agent is reset when a transaction is accepted from the agent. The comparator 206 couples to a state machine 208.

A state machine 208 has an activated state and a deactivated state. In an embodiment, when the state machine operates in a service state, the mechanism to resolve instruction starvation is activated. The state machine 208 transitions from/to an activated state to resolve a detected instruction starvation condition by accepting exactly one transaction from each agent attempting to use the system resource until all of the agents attempting to use that system resource make forward progress on executing an instruction stream. In an embodiment, the state machine 208 may use an alternative algorithm to ensure fairness occurs between the agents when instruction starvation is detected.

The state machine 208 transitions to a deactivated state if an agent which issued a first transaction does not reissue the first transaction within a predefined time period after receiving a retry response. The state machine 208 also transitions to a deactivated state if one or more logical conditions exist which, if satisfied, deactivate the mechanism to resolve instruction starvation. In an embodiment, if all of the retry counters for all of the agents are reset, the state machine 208 transitions to deactivate the mechanism to resolve instruction starvation. Similarly, if the retry timeout counter 210 exceeds a timeout counter threshold, then the state machine 208 transitions to deactivate the mechanism to resolve instruction starvation.

In an embodiment, when the state machine 208 is in a normal state the mechanism to resolve instruction starvation is deactivated. The comparators 206 monitor the number of consecutive retries from each agent. In an embodiment, when the threshold for the number of retry responses is equaled or exceeded, and when the logic can accept the first transaction that caused a retry counter to reach the trigger the threshold, the state machine 208 moves to the service state.

In service state, the system resource, such as, for example, a chipset, accepts exactly one transaction from each agent with a non-zero retry counter 204. When all of the retry counters 204 are reset, or if a timeout threshold has been exceeded, such as a certain number of transactions are issued retry responses in service state, then the state machine 208 transitions back to the normal state.

One or more retry timeout counters 210 to assist in resolving instruction starvation if an agent which issued a first transaction does not reissue the first transaction after receiving a retry response within a predefined time period. In an embodiment, after the state machine 208 begins operation in service state, i.e., the mechanism to resolve instruction starvation is activated, the retry timeout counter 210 starts to increment by one each time the logic issues a retry response to any of the agents attempting to use the system resource. In an embodiment, the retry timeout counter 210 starts to increment by clock pulses or actual time intervals. The retry timeout counter 210 eventually increments high enough to equal or exceed the value of the timeout counter threshold. When this predefined period of time established by the timeout counter threshold is equaled or exceeded, then the retry timeout counter 210 sends a deactivation signal to the state machine 208. In an embodiment, the state machine 208 transitions from the Service State to the Normal State upon receiving the signal. Also, the retry timeout counter 210 also send a signal to the variable timeout counter 212.

The variable timeout counter 212 increases the predefined period of time used by the retry timeout counter 210 to trigger the mechanism to resolve instruction starvation to transition from an activated state to a deactivated state. In an embodiment, the variable timeout counter 212 increases the number of retry responses needed to trigger the timeout counter threshold. In each time the retry timeout counter 210 issues the deactivation signal, the variable timeout counter 212 increases the value for the timeout threshold. In an embodiment, the timeout threshold starts at a set minimum value, and is incremented with each time the state machine 208 transitions from the service state to the Normal State. In an embodiment, when the timeout threshold exceeds a maximum value, then the timeout threshold is returned to the set minimum value.

Figure 3:
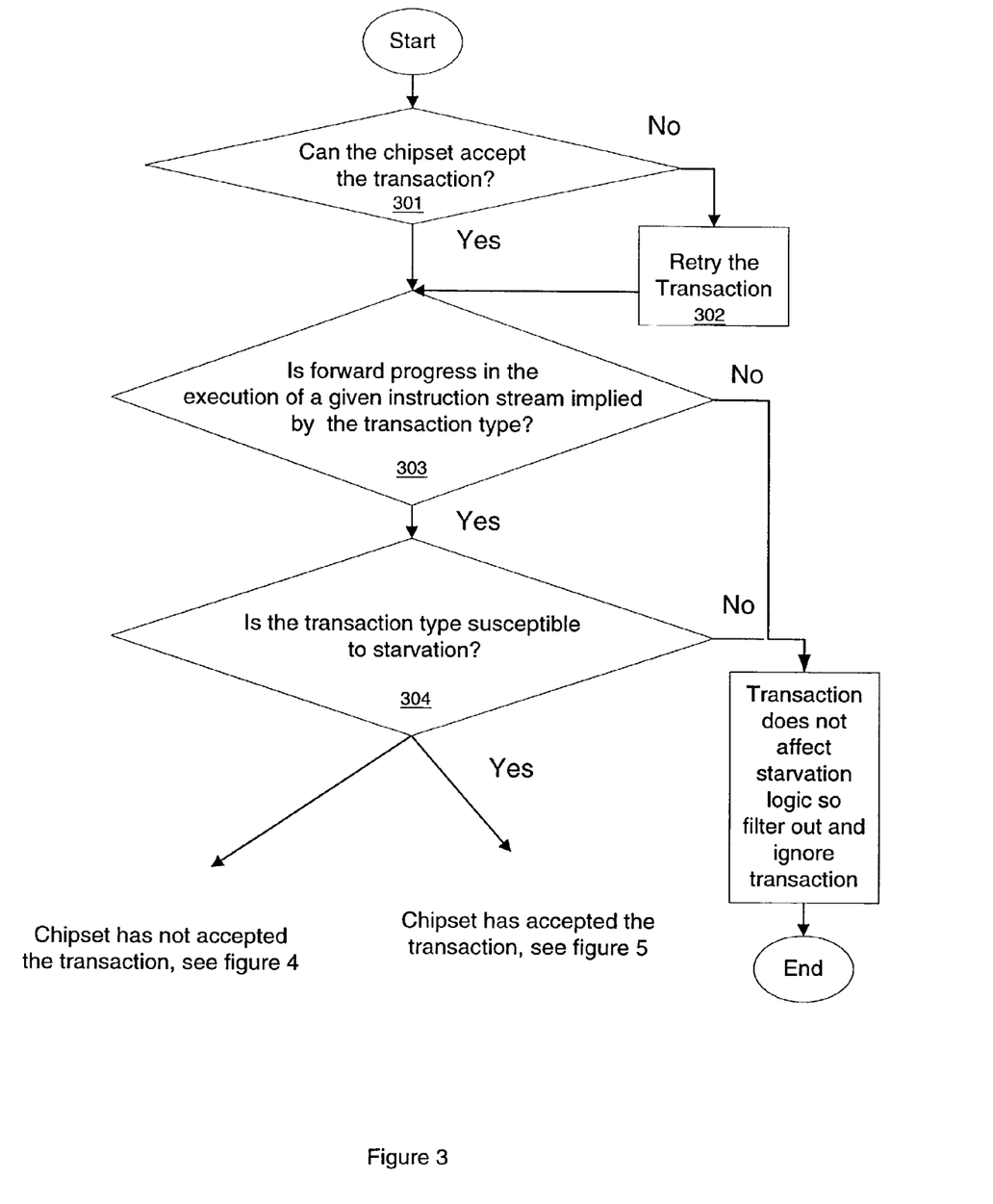
FIG. 3, FIG. 4, and FIG. 5 illustrate a flow diagram of data flow through an embodiment of the logic to resolve instruction starvation.
Figure 4:
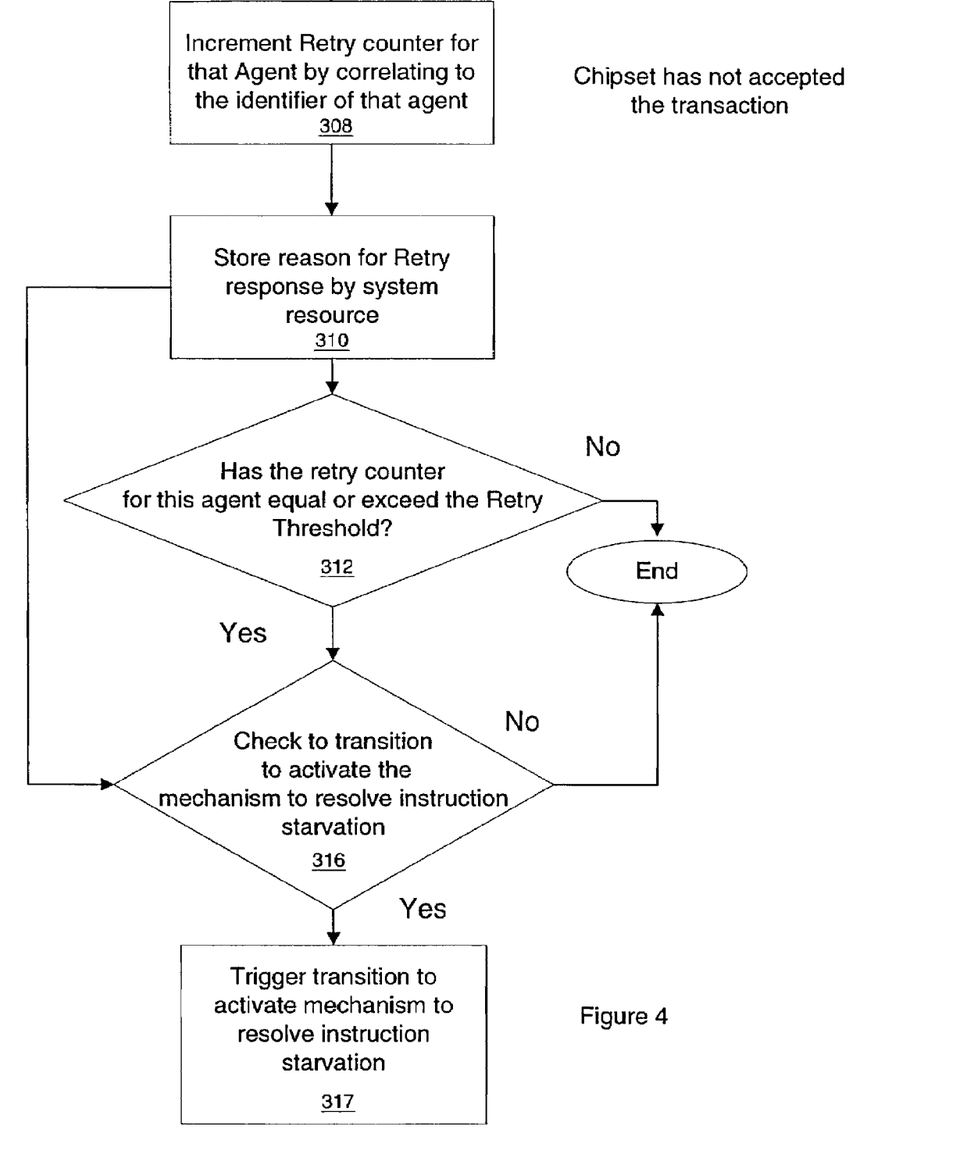
Figure 5:
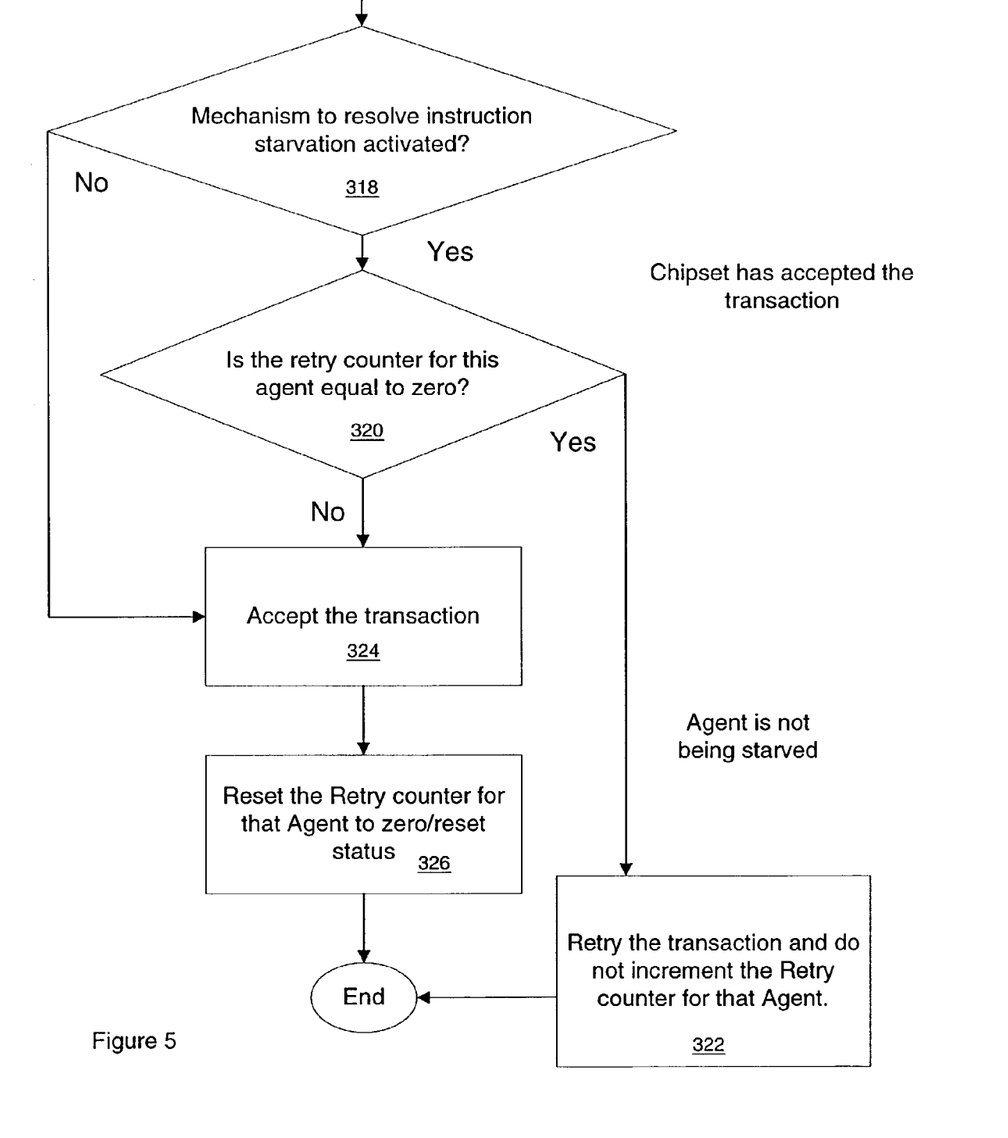

FIG. 3, FIG. 4, and FIG. 5 illustrate a flow diagram of an embodiment of the logic to resolve instruction starvation. In general, in an embodiment a controller, for a system resource such as a chipset, determines whether the resources are available to accept the transaction. If the resources are not available, the transaction is retried and the logic proceeds to determine whether the anti-starvation logic should be affected. If the transaction implies forward progress, and is susceptible to starvation as well as mechanism to resolve instruction starvation is not activated, then the retry counter is incremented. If the increment causes the counter to exceed the threshold, then the logic waits until that transaction can be accepted and then triggers activation of the mechanism to resolve instruction starvation. If the resources were available, and the mechanism to resolve instruction starvation is not activated as well as the retry counter for that agent is greater than zero (indicating that this transaction has been most recently retried), then the transaction is accepted and the retry counter is cleared. If the resources were available, the mechanism to resolve instruction starvation is activated, and the retry counter for the agent is equal to zero (indicating that this transaction has been serviced) the transaction is retried. Once the mechanism to resolve instruction starvation is activated, then it may be deactivated upon satisfying certain designed conditions. In an embodiment, an example flow diagram may be as follows.

In block 301, a controller for a system resource, such as a chip set, determines whether the resources are available to accept the transaction. If the resources are not available, the transaction is retried in block 302 and the logic proceeds to determine whether the anti-starvation logic should be affected. If the system resource does not accept the transaction the logic may proceed to blocks 303 and 304 to filters out certain transaction types and then to block 308 to determine whether to activate the mechanism to resolve instruction starvation. Also, if the system resource does accept the transaction the logic may proceed to blocks 303 and 304 to filters out certain transaction types and then to step 318 to veto the acceptance of the transaction.

In block 303 and block 304, the anti-starvation logic filters out transaction types that should not trigger activation of the mechanism to resolve instruction starvation in a computing processing system. The multiple agents attempting send their transactions to the controller for the system resource. The anti-starvation logic detects these transactions. The anti-starvation logic then ignores these transactions as potential triggers to activate or deactivate the anti-starvation logic.

In block 303, the anti-starvation logic determines forward progress in the execution of a given instruction stream implied by the transaction type. If the transaction type does not imply forward progress, then the anti-starvation logic ignores the transaction as a potential trigger to activate or deactivate the mechanism to resolve instruction starvation.

In block 304, the anti-starvation logic determines the transaction type susceptible to starvation. Certain transaction types such as an explicit writeback operation are not susceptible to instruction starvation. The writeback operation simply writes over whatever contents where in that memory location. Starvation susceptible operations may be, for example, operations requesting to read the contents in a given memory location as long as some other agent is not currently using that memory location. If the transaction type is not susceptible to instruction starvation, then the anti-starvation logic ignores the transaction as a potential trigger to activate or deactivate the mechanism to resolve instruction starvation.

If the system resource does not accept the transaction the logic proceeds to step 308. If the system resource accepted the transaction the logic proceeds to step 318.

In block 308, the anti-starvation logic increments the retry counter for that agent by correlating to the identifier of that agent. The logic decodes the transaction to obtain the agent's unique agent ID or thread ID. In an embodiment, the retry counter is logic and one retry counter exists for each possible agent. In an embodiment, the logic dedicates a new space in the memory to as a retry counter for each individual agent attempting to use the system resource. In an embodiment, after system reset occurs or cycle reset occurs, each retry counter starts off with a zero count. Each time the system resource issues a retry response to the unique agent ID or thread ID the retry counter for that agent is incremented by one.

In block 310, the anti-starvation logic detects and stores the reason why the controller issued a retry response by the system resource. For example, the controller issues a retry response to a first agent because the system resource, a buffer, was full and could not accept more data at that time. The anti-starvation logic detects the rejection. The anti-starvation logic then stores the reason why the controller issued a retry response tied to the unique identifier of that agent, so that the controller does not start retrying transactions until it can accept the transaction it wants to favor.

In block 312, the anti-starvation logic determines whether a retry counter for any agent attempting to use the system resource equals or exceeds a set retry threshold, such as fifteen retries issued.

In block 316, if any retry counter equals or exceeds a set retry threshold, then the anti-starvation logic checks to transition to activate the mechanism to resolve instruction starvation. In an embodiment, only the retry counter for the agent that initiated the current transaction can hit the threshold, the other counters have the same value they had last time. In an embodiment, the anti-starvation logic checks to transition a state machine to operate in Service State in order to initiate the mechanism to resolve instruction starvation.

In block 317, if the increment causes the counter to exceed threshold, the logic waits until that transaction can be accepted and then activates the mechanism to resolve instruction starvation. In an embodiment, two conditions must exist in order to activate the mechanism to resolve instruction starvation. First, a retry counter for any agent must equal or exceed the retry threshold set for that counter. Second, the stored reason why the controller issued a retry response to the transaction that caused the retry counter to equal or exceed the retry threshold must have been remedied.

In block 318, the system has accepted the transaction and is available to act upon the transaction. The anti-starvation logic determines whether the mechanism to resolve instruction starvation is activated. In an embodiment, the mechanism to resolve instruction starvation activates in step 317. In an embodiment, the anti-starvation logic determines whether a state machine is operating in Service State. If the mechanism to resolve instruction starvation is activated, then the logic proceeds to block 320. If the mechanism to resolve instruction starvation is not activated, then the logic proceeds to block 324.

In block 320, the anti-starvation logic determines whether the retry counter for the agent associated with this accepted transaction equal to zero. In an embodiment, when the mechanism to resolve instruction starvation is activated, then the logic accepts exactly one transaction from each agent attempting to use the system resource until all of the agents attempting to use that system resource make forward progress on executing an instruction stream. Thus, if the retry counter associated with this agent is reset to zero, then this agent has already been given its one transaction. The anti-starvation logic proceeds to block 322. If the retry counter associated with this agent is not reset to zero, then this agent is given its one transaction and proceeds to block 324.

In block 322, the anti-starvation logic issues a veto to a transaction accepted by the system resource. The controller for the system resource automatically responds with a retry response to the agent associated with that transaction and does not increment the retry counter for that agent. Thus the retry counter for that agent remains reset.

In block 324, the system resource accepts the transaction. If the mechanism to resolve instruction starvation was not activated, the mechanism is still not activated and the logic proceeds to block 326. If the mechanism to resolve instruction starvation is activated, then this is the one transaction to be accepted for that agent. The logic proceeds to block 326. However, upon receiving the next transaction associated with that agent ID or thread ID the retry counter for that agent will be reset and the mechanism to resolve instruction starvation will be activated. Thus, the anti-starvation logic will follow the flow to block 322 and veto the system resources acceptance of the transaction.

In block 326, the anti-starvation logic resets the retry counter for the agent associated with that transaction to zero/reset status.

Figure 6:
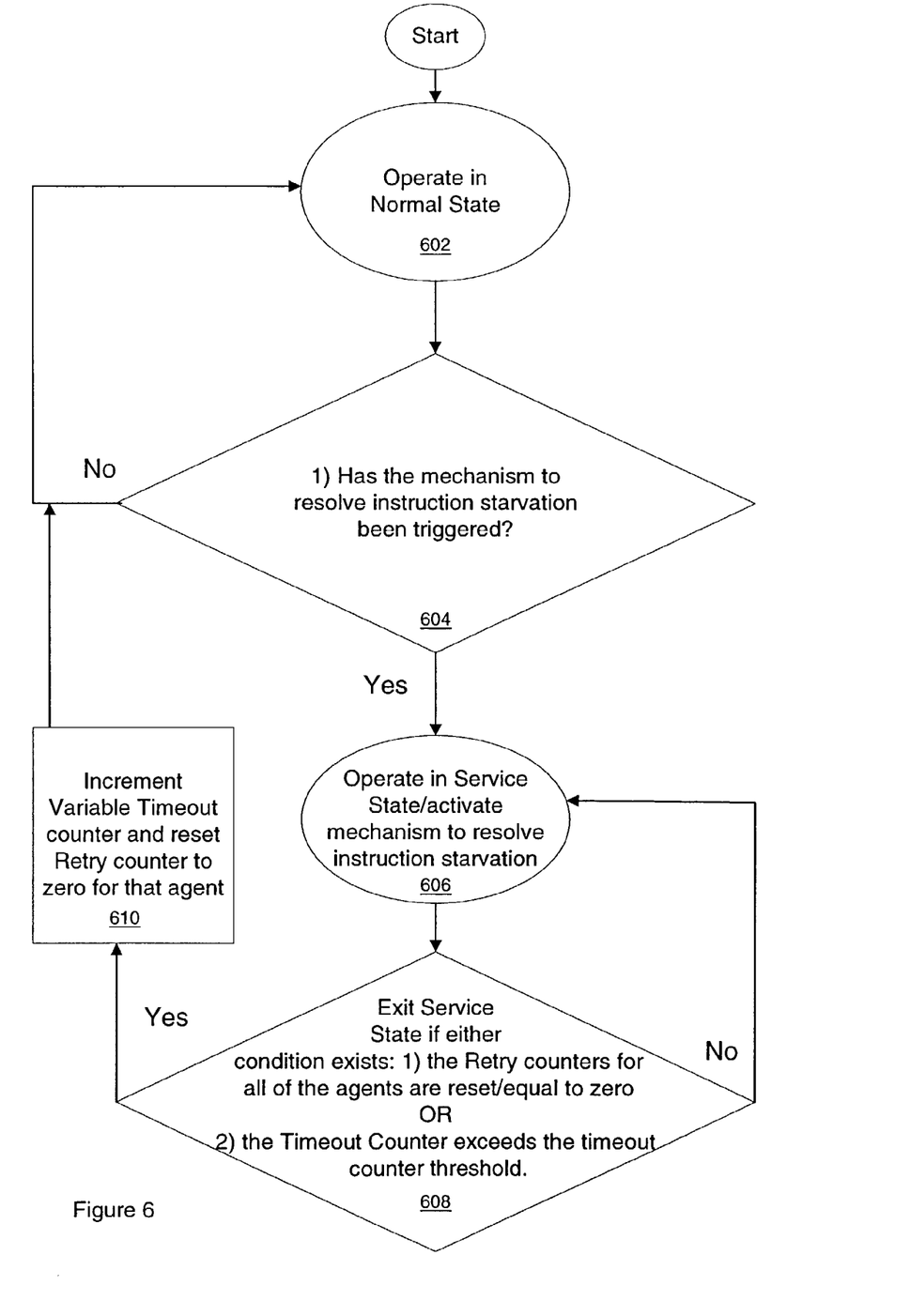
FIG. 6 illustrates a flow diagram of data flow through an embodiment of logic to activate and deactivate the mechanism to resolve instruction starvation.

FIG. 6 illustrates a flow diagram of an embodiment of logic to activate and deactivate the mechanism to resolve instruction starvation.

In block 602, nominally the controller for the system resource operates in standard mode accepting or generating retry responses as appropriate. In an embodiment, the anti-starvation logic includes a state machine. The state machine nominally operates in the Normal State until triggered to transition to the service state.

In block 604, as noted in block 316 the anti-starvation logic checks to see if conditions exist to activate the mechanism to resolve instruction starvation. In an embodiment, the mechanism to resolve instruction starvation activates in step 317. In an embodiment, two conditions must exist in order to activate the mechanism to resolve instruction starvation. First, a retry counter for any agent must equal or exceed the retry threshold set for that counter. Second, the stored reason why the controller issued a retry response to the transaction that caused the retry counter to equal or exceed the retry threshold must have been remedied. Thus, the logic determines whether the chipset ready is to accept the transaction that tripped the retry threshold at this time. If not, as soon as the system resource that was unavailable at the time of the transaction was received is now available for use again, then the two conditions are satisfied to activate the mechanism to resolve instruction starvation.

For example, a buffer is full when the transaction from a first agent is received. The logic generates a retry response to the first agent. The retry counter increments for the retry counter associated with the first agent. The retry response was, for example, the thirtieth, retry response to that first agent, which now causes the retry counter to equal the retry threshold. The first condition is satisfied. However, time must pass for the buffer to free up its memory space. The stored reason why a retry response was issued is that the buffer was unavailable. The second condition needed to activate the mechanism to resolve instruction starvation occurs when the buffer frees up and becomes available.

In block 606, the logic activates a mechanism to resolve instruction starvation because it is determined that instruction starvation is occurring. In an embodiment, the logic determines that instruction starvation is occurring if an agent sending a transaction to the system resource exceeds its retry threshold and the system resource is ready to accept the transaction that tripped the retry threshold. In an embodiment, other conditions may be used to determine that instruction starvation is occurring. After activating the mechanism to resolve instruction starvation one algorithm employed accepts exactly one transaction from each agent attempting to use the system resource until all of the agents attempting to use that system resource make forward progress on executing an instruction stream. In an embodiment, a state machine transitions from operating in the Normal State to operating in the service state.

In block 608, the mechanism to resolve instruction starvation may deactivate if one or more logical conditions exist. In an embodiment, two conditions may exist to deactivate the mechanism to resolve instruction starvation. First, an agent that issued the transaction to trigger the activation does not reissue that transaction within a pre-defined time period may deactivate the mechanism. The agent may not reissue the first transaction type because the first transaction was speculative or a circumstance exists to prevent the agent from reissuing the first transaction. In an embodiment, the predefined time period may consist of a set amount of retry responses sent to any of the agents attempting to use the system resource. Similarly, the predefined time period may consist of a threshold amount of time, such as 20 microseconds.

Second, the mechanism may be deactivated if all of the retry counters are reset for all the agents attempting to use the system resource. Thus if either of these two conditions are satisfied, then the mechanism deactivates. In an embodiment, a state machine transitions from the Service State to the Normal State.

In block 610, when the mechanism to resolve instruction starvation transitions from an activated state to a deactivated state the predefined time period is incremented to increase the variable time delay and the retry counter for the agent that issued the transaction which activated the mechanism is reset to zero. Thus the agent that potentially was suffering instruction starvation was given an opportunity to use the system resource while all the other agents were being sent retry responses. However, since the agent never issued any transactions after the mechanism was activated, then the system essentially resets itself instead of crashing. The system increases the predefined period of time just in case the starting the predefined period of time set for agent being instruction starved operates was too short to allow the agent to issue another transaction.

In one embodiment, the software used to facilitate the logic including the instruction starvation resolution mechanism can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. Slower mediums could be cached to a faster, more practical, medium.

Figure 7:
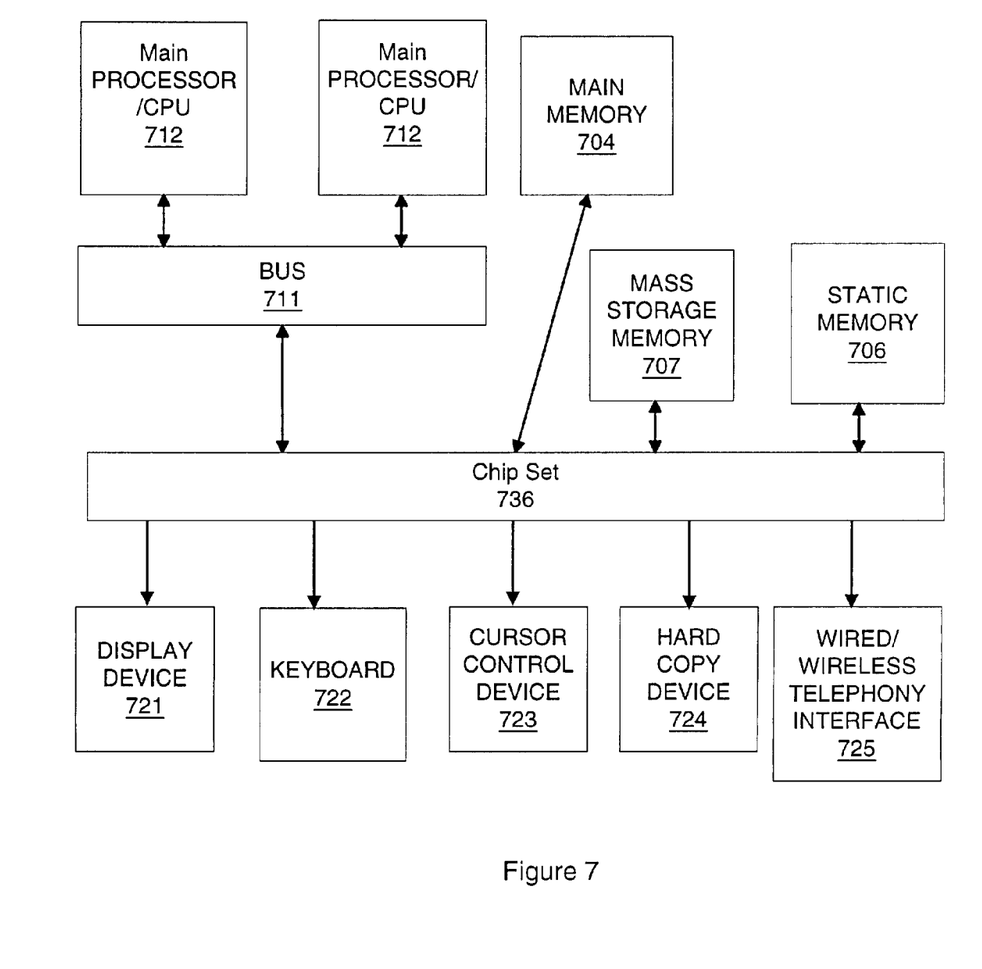
FIG. 7 illustrates a block diagram of an example computer system that may use logic to activate and deactivate the mechanism to resolve instruction starvation.

FIG. 7 illustrates a block diagram of an example computer system that may use an embodiment of logic to activate and deactivate the mechanism to resolve instruction starvation. In one embodiment, computer system 700 comprises a communication mechanism or bus 711 for communicating information, and an integrated circuit component such as a processor 712 coupled with bus 711 for processing information. One or more of the components or devices in the computer system 700 such as the processor 712 or a chip set 736 may use an embodiment of logic to activate and deactivate the mechanism to resolve instruction starvation.

Computer system 700 further comprises a random access memory (RAM), or other dynamic storage device 704 (referred to as main memory) coupled to bus 711 for storing information and instructions to be executed by processor 712. Main memory 704 also may be used for storing temporary variables or other intermediate information during execution of instructions by processor 712. In an embodiment, the Processor 712 may include a microprocessor, but is not limited to a microprocessor, such as a Pentium, PowerPC, etc.

Computer system 700 also comprises a read only memory (ROM) and/or other static storage device 706 coupled to bus 711 for storing static information and instructions for processor 712, and a mass storage memory 707, such as a magnetic disk or optical disk and its corresponding disk drive. Mass storage memory 707 is coupled to bus 711 for storing information and instructions.

Computer system 700 may further be coupled to a display device 721, such as a cathode ray tube (CRT) or liquid crystal display (LCD), coupled to bus 711 for displaying information to a computer user. An alphanumeric input device (keyboard) 722, including alphanumeric and other keys, may also be coupled to bus 711 for communicating information and command selections to processor 712. An additional user input device is cursor control device 723, such as a mouse, trackball, trackpad, stylus, or cursor direction keys, coupled to bus 711 for communicating direction information and command selections to processor 712, and for controlling cursor movement on a display device 712.

Another device that may be coupled to bus 711 is a hard copy device 724, which may be used for printing instructions, data, or other information on a medium such as paper, film, or similar types of media. Furthermore, a sound recording and playback device, such as a speaker and/or microphone (not shown) may optionally be coupled to bus 711 for audio interfacing with computer system 700. Another device that may be coupled to bus 711 is a wired/wireless communication capability 725 to communication to a phone.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. For example, most functions performed by electronic hardware components may be duplicated by software emulation. Thus, a software program could issue a command to mimic a user event command code. The algorithm detecting a user event command, even though an actual user event has not occurred, directly transitions the processor to a higher state of performance. In an embodiment, a prioritize event may be a software command issued to invoke the direct transition the processor to a higher state of performance. The counters may be decremented rather than incremented. Underflow logic may establish the threshold limit of retries. The processor may be constructed so that the system makes forward progress on executing an instruction stream progress as long as all of the agents attempting to use that system resource to complete two or more transactions. The invention is to be understood as not limited by the specific embodiments described herein, but only by scope of the appended claims.

We claim:

1. A method, comprising:
   determining whether instruction starvation is occurring based upon detecting whether a first transaction from a first agent has not been accepted by a system resource;
   activating a mechanism to resolve instruction starvation if it is determined that instruction starvation is occurring; and
   deactivating the mechanism to resolve instruction starvation if an agent which issued the first transaction does not reissue the first transaction within a predefined time period.

2. The method of claim 1, wherein the agent does not reissue the first transaction because the first transaction was speculative or a circumstance exists to prevent the agent from reissuing the first transaction.

3. The method of claim 1, wherein the predefined time period comprises a threshold amount of retry responses sent to one or more agents.

4. The method of claim 3, wherein the threshold amount of retry responses comprises an adjustable number of retry responses that increases if the mechanism to resolve instruction starvation transitions from an activated state to a deactivated state.

5. The method of claim 1, wherein the predefined time period comprises a threshold amount of time.

6. The method of claim 1, further comprising:
filtering out transaction types that do not trigger activation of the mechanism to resolve instruction starvation in a computing processing system.

7. The method of claim 1, further comprising:
increasing a duration of the predefined time period if the mechanism to resolve instruction starvation transitions from an activated state to a deactivated state.

8. The method of claim 1, further comprising:
deactivating the mechanism to resolve instruction starvation also if one or more logical conditions exist which if satisfied deactivate the mechanism to resolve instruction starvation.

9. The method of claim 8, wherein at least one of the one or more logical conditions comprises all of the retry counters being reset for all the agents attempting to use the system resource.

10. The method of claim 1, further comprising:
receiving the first transaction from the first agent having a unique identifier;
associating a retry response sent in response to the first transaction with the unique identifier of the first agent that issued the first transaction.

11. The method of claim 1, further comprising:
after activating the mechanism to resolve instruction starvation, accepting exactly one transaction from each agent attempting to use the system resource until all of the agents attempting to use that system resource make forward progress on executing an instruction stream.

12. The method of claim 1, further comprising:
determining that instruction starvation is occurring if an agent sending a transaction to the system resource exceeds its retry threshold and the system resource is ready to accept the transaction that tripped the retry threshold.

13. The method of claim 1, further comprising:
after the first transaction has been accepted, initiating an acceptance of the first transaction and determining if conditions exist for the mechanism to resolve instruction starvation to veto the acceptance.

14. The method of claim 1, further comprising:
after the first transaction has not been accepted, initiating a retry response for the first transaction and then determining if conditions exist to activate the mechanism to resolve instruction starvation.

15. A machine-readable medium that provides instructions, which when executed by a machine, cause the machine to perform operations comprising:
determining whether instruction starvation is occurring based upon detecting whether a first transaction from a first agent has not been accepted by a system resource;
activating a mechanism to resolve instruction starvation if it is determined that instruction starvation is occurring; and
deactivating the mechanism to resolve instruction starvation if an agent which issued the first transaction does not reissue the first transaction within a predefined time period.

16. The article of manufacture of claim 15, further comprising instructions which, when executed by the machine, cause the machine to perform the further operations comprising:
associating retry responses sent in response to the first transaction with the first agent that issued the first transaction.

17. The article of manufacture of claim 15, further comprising instructions which, when executed by the machine, cause the machine to perform the further operations comprising:
after the first transaction has been accepted, initiating an acceptance of the first transaction and determining if conditions exist for the mechanism to resolve instruction starvation to veto the acceptance.

18. The article of manufacture of claim 15, further comprising instructions which, when executed by the machine, cause the machine to perform the further operations comprising:
after activating the mechanism to resolve instruction starvation, accepting exactly one transaction from each agent attempting to use the system resource until all of the agents attempting to use that system resource make forward progress on executing an instruction stream.

19. The article of manufacture of claim 15, further comprising instructions which, when executed by the machine, cause the machine to perform the further operations comprising:
determining that instruction starvation is occurring if an agent sending a transaction to the system resource exceeds its retry threshold and the system resource is ready to accept the transaction that tripped the retry threshold.

20. The article of manufacture of claim 15, wherein the predefined time period comprises a retry threshold limit equal to or greater than a preset number of consecutive retries.

21. An apparatus, comprising:
means for determining whether instruction starvation is occurring based upon detecting whether a first transaction from a first agent has not been accepted by a system resource;
means for resolving instruction starvation if it is determined that instruction starvation is occurring; and
means for disengaging the mechanism to resolve instruction starvation if an agent which issued the first transaction does not reissue the first transaction within a predefined time period.

22. The apparatus of claim 21, further comprising:
means for associating retry responses sent in response to the first transaction with the first agent that issued the first transaction.

23. The apparatus of claim 21, further comprising:
means for after the first transaction has been accepted, initiating an acceptance of the first transaction and determining if conditions exist for the mechanism to resolve instruction starvation to veto the acceptance.

24. The apparatus of claim 21, further comprising:
means for after activating the mechanism to resolve instruction starvation, accepting exactly one transaction from each agent attempting to use the system resource until all of the agents attempting to use that system resource make forward progress on executing an instruction stream.

25. The apparatus of claim 21, further comprising:
means for determining that instruction starvation is occurring if an agent sending a transaction to the system resource exceeds its retry threshold and the system resource is ready to accept the transaction that tripped the retry threshold.

26. An apparatus, comprising:
logic to determine whether instruction starvation is occurring and to resolve the instruction starvation if an agent that issued a first transaction does not reissue the first transaction within a predefined time period, wherein the logic comprises a state machine having an activated state and a deactivated state, the state machine to transition the activated state to resolve a detected instruction starvation condition by accepting exactly one transaction from each agent attempting to use the system resource until all of the agents attempting to use that system resource make forward progress on executing an instruction stream, the state machine to transition to the deactivated state if an agent which issued a first transaction does not reissue the first transaction after receiving a retry response within a predefined time period.

27. The apparatus of claim 26, wherein the logic comprises electronic circuits that follow the rules of Boolean Logic.

28. The apparatus of claim 26, wherein the logic to associate retry responses sent in response to the first transaction with the first agent that issued the first transaction.

29. The apparatus of claim 26, wherein the logic further comprises:
one or more filters to filter out transaction that should not trigger activation of the mechanism to resolve instruction starvation.

30. The apparatus of claim 26, wherein the state machine deactivates the mechanism to resolve instruction starvation also if one or more logical conditions exist which if satisfied deactivate the mechanism to resolve instruction starvation.

31. The apparatus of claim 26, wherein the logic further comprises:
a retry timeout counter to resolve instruction starvation if an agent which issued a first transaction does not reissue the first transaction after receiving a retry response within a predefined time period; and
a variable timeout counter to increase the predefined period of time used by the retry timeout counter to trigger the mechanism to resolve instruction starvation to transition from the activated state to the deactivated state.

32. The apparatus of claim 26, wherein the logic further comprises:
two or more retry counters to associate retry responses sent in response to a transaction with a corresponding agent that issued the transaction based upon the unique agent identifier associated with the transaction; and
one or more comparators to determine if a given agent exceeds a retry threshold limit, a first retry counter to communicate to a first comparator the number of retry responses sent in response to a transaction with the corresponding agent that issued the transaction.

33. The apparatus of claim 26, wherein the agent comprises a thread.

34. A computer system, comprising:
a bus;
a plurality of agents sharing the bus; and
a processor having logic to determine whether instruction starvation is occurring and to resolve the instruction starvation if an agent that issued a first transaction does not reissue the first transaction within a predefined time period, wherein the logic within the processor comprises a state machine having an activated state and a deactivated state, the state machine to transition the activated state to resolve a detected instruction starvation condition by accepting exactly one transaction from each agent attempting to use the system resource until all of the agents attempting to use that system resource make forward progress on executing an instruction stream, the state machine to transition to the deactivated state if the agent which issued the first transaction does not reissue the first transaction after receiving a retry response within the predefined time period.

35. The computer system of claim 34, wherein the predefined time period comprises a retry threshold limit equal to or greater than a preset number of consecutive retries.

36. The computer system of claim 34, wherein the logic further comprises:
two or more retry counters to associate retry responses sent in response to a transaction with a corresponding agent that issued the transaction based upon the unique agent identifier associated with the transaction; and
one or more comparators to determine if a given agent exceeds a retry threshold limit, a first retry counter to communicate to a first comparator the number of retry responses sent in response to a transaction with the corresponding agent that issued the transaction.

37. The computing system of claim 34, wherein the logic to also associate retry responses sent in response to a first transaction with a first agent that issued the first transaction based upon a unique agent identifier associated with the first agent.

* * * * *